United States Patent
Mo et al.

(10) Patent No.: US 12,443,313 B2
(45) Date of Patent: Oct. 14, 2025

(54) ELECTRONIC DEVICE CONTROL METHOD AND ELECTRONIC DEVICE

(71) Applicant: HUAWEI TECHNOLOGIES CO., LTD., Guangdong (CN)

(72) Inventors: Jiabao Mo, Dongguan (CN); Kaifeng Deng, Dongguan (CN); Yang Zou, Dongguan (CN); Junyong Zhang, Dongguan (CN)

(*) Notice: Subject to any disclaimer, the term of this patent is extended or adjusted under 35 U.S.C. 154(b) by 0 days.

(21) Appl. No.: 18/935,677

(22) Filed: Nov. 4, 2024

(65) Prior Publication Data

US 2025/0060848 A1 Feb. 20, 2025

Related U.S. Application Data

(63) Continuation of application No. PCT/CN2023/090948, filed on Apr. 26, 2023.

(30) Foreign Application Priority Data

May 13, 2022 (CN) .......................... 202210518501.3

(51) Int. Cl.
*G06F 3/041* (2006.01)

(52) U.S. Cl.
CPC ...... *G06F 3/04184* (2019.05); *G06F 3/04162* (2019.05); *G06F 3/04166* (2019.05)

(58) Field of Classification Search
CPC ............ G06F 3/04184; G06F 3/04162; G06F 3/04166; G06F 3/03545; G06F 3/038; G06F 3/0383; G06F 3/0441; G06F 3/0442; G06F 3/0412
See application file for complete search history.

(56) References Cited

U.S. PATENT DOCUMENTS

| | | | |
|---|---|---|---|
| 10,739,909 B1* | 8/2020 | Lin | .................. G09G 5/003 |
| 2019/0179475 A1 | 6/2019 | Seo et al. | |
| 2022/0326805 A1* | 10/2022 | Lin | ................ G06F 3/04162 |

* cited by examiner

*Primary Examiner* — Jonathan A Boyd

(57) ABSTRACT

An electronic device control method is provided. The method may be applied to an electronic device having a touchscreen. A display drive circuit and a touch sensor that match the touchscreen are configured in the electronic device. The method includes: The display drive circuit performs pixel scan. The touch sensor collects a touch signal once after the display drive circuit scans S rows of pixels each time, where $S \geq 1$. Touch signals collected N consecutive times are used as one group. An uplink synchronization signal is transmitted to the outside in a slot for collecting a touch signal for the $K^{th}$ time in each group, where $1 \leq K \leq N$. The uplink synchronization signal is used to perform time alignment with an external device.

20 Claims, 6 Drawing Sheets

ELECTRONIC DEVICE CONTROL METHOD AND ELECTRONIC DEVICE

CROSS-REFERENCE TO RELATED APPLICATIONS

This application is a continuation of International Application No. PCT/CN2023/090948, filed on Apr. 26, 2023, which claims priority to Chinese Patent Application No. 202210518501.3, filed on May 13, 2022. The disclosures of the aforementioned applications are hereby incorporated by reference in their entireties.

TECHNICAL FIELD

This application relates to the field of terminal technologies, and in particular, to an electronic device control method and an electronic device.

BACKGROUND

With development of electronic devices, electronic devices such as tablet computers or large-sized graphics tablets are growing explosively. In addition, application software, especially drawing software and the like, configured on an electronic device increasingly requires a touch with higher precision. Currently, a stylus is usually used as one of input devices of the electronic device. A character input function of the electronic device can be easily implemented by using the stylus.

In a process of using the electronic device, a screen refresh rate of the electronic device may be dynamically switched with a change of a scene displayed by the electronic device. After the screen refresh rate of the electronic device is switched, for example, after the screen refresh rate is switched from 120 Hz to 90 Hz, a phenomenon of discontinuous lines often occurs when the stylus is used to perform input on the electronic device.

SUMMARY

This application provides an electronic device control method, a stylus control method, a control method applied to a system including an electronic device and a stylus, an electronic device, a stylus, a computer storage medium, and a computer program product, to reduce a probability of discontinuous lines occurring when a stylus performs input on an electronic device, and improve user experience.

According to a first aspect, this application provides an electronic device control method. The method may be applied to an electronic device having a touchscreen. A display drive circuit and a touch sensor that match the touchscreen are configured in the electronic device. The display drive circuit performs pixel scan. The touch sensor collects a touch signal once after the display drive circuit scans S rows of pixels each time, where S≥1. Touch signals collected N consecutive times are used as one group. An uplink synchronization signal is transmitted to the outside in a slot for collecting a touch signal for the $K^{th}$ time in each group, where 1≤K≤N. The uplink synchronization signal is used to perform time alignment with an external device. For example, the external device may be a device other than the electronic device. For example, the display drive circuit may scan pixels row by row.

In this way, regardless of changes in a frame rate of the touchscreen on the electronic device, time for collecting a touch signal by the electronic device each time is fixed. Therefore, collecting, by the electronic device, a downlink signal transmitted by a stylus is not affected, reducing a probability of inputting discontinuous lines by the stylus, and improving user experience.

According to the first aspect, S=H/N. H is a quantity of rows of pixels that the display drive circuit needs to scan when the touchscreen displays one frame of image at a standard frame rate. In this way, switching between frame rates that can exactly divide (F*N) can be supported.

According to the first aspect or any one of the foregoing implementations of the first aspect, the slot for collecting a touch signal for the $K^{th}$ time in each group is shorter than a slot for collecting a touch signal each time other than the $K^{th}$ time in each group. Time required for transmitting the uplink synchronization signal is short, and time required for collecting a touch signal is long. Therefore, to avoid a waste of time, a slot occupied for transmitting the uplink synchronization signal may be reduced.

According to the first aspect or any one of the foregoing implementations of the first aspect, the method further includes: determining a total quantity of rows of pixels scanned by the display drive circuit between a first frame synchronization signal and a second frame synchronization signal, where the second frame synchronization signal is adjacent to the first frame synchronization signal and is a next frame synchronization signal of the first frame synchronization signal; and when the total quantity of rows is less than a target quantity of rows, re-counting a quantity of rows of pixels scanned by the display drive circuit, where the target quantity of rows is a quantity of rows of pixels that need to be scanned by the display drive circuit to display one frame of image at a target frame rate, and the target frame rate is a current display frame rate of the touchscreen. In this way, a horizontal synchronization signal (namely, an HSYNC signal) is calibrated through a frame synchronization signal (namely, a VSYNC signal).

According to the first aspect or any one of the foregoing implementations of the first aspect, the method further includes: determining to establish a connection to the stylus; and when the display drive circuit scans (K*S) rows of pixels for the first time after obtaining the frame synchronization signal, transmitting the uplink synchronization signal to the outside, where the uplink synchronization signal is used to perform time alignment with the stylus. In this way, time sequence alignment is performed on the stylus by using a first time, to avoid discontinuous lines during stylus input.

According to the first aspect or any one of the foregoing implementations of the first aspect, the method further includes: The touch sensor obtains the downlink signal transmitted by the stylus. The touchscreen displays a touch position corresponding to the obtained downlink signal.

According to the first aspect or any one of the foregoing implementations of the first aspect, the method further includes: when a connection to the stylus is established for the first time, sending a downlink parameter to the stylus, where the downlink parameter includes: an offset of a first downlink signal from a start position of the frame synchronization signal, a time interval between adjacent downlink signals, and time required for each downlink signal. In this way, time sequence alignment is performed on the downlink signal transmitted by the stylus by using the downlink parameter.

According to the first aspect or any one of the foregoing implementations of the first aspect, the time required for each downlink signal is longer than a slot for collecting a touch signal each time. In this way, a probability that the electronic device cannot accurately collect the downlink signal of the stylus due to loss of the horizontal synchronization signal is reduced.

According to a second aspect, this application provides a stylus control method. The method may be applied to a stylus matching an electronic device. A touchscreen, and a display drive circuit and a touch sensor that match the touchscreen are configured in the electronic device. The method includes: determining to establish a connection to the electronic device; obtaining an uplink synchronization signal transmitted by the electronic device, where the touch sensor collects a touch signal once after the display drive circuit scans S rows of pixels each time, and S≥1; and the electronic device uses touch signals collected N consecutive times as one group and transmits the uplink synchronization signal to the outside in a slot for collecting a touch signal for the $K^{th}$ time in each group, 1≤K≤N, and the uplink synchronization signal is used to perform time alignment with an external device; and transmitting a downlink signal to the electronic device based on a downlink parameter negotiated when a connection to the electronic device is established for the first time, where the downlink parameter includes: an offset of a first downlink signal from a start position of a frame synchronization signal in the electronic device, a time interval between adjacent downlink signals, and time required for each downlink signal.

According to the second aspect, the time required for each downlink signal is longer than a slot for collecting a touch signal each time.

According to a third aspect, this application provides a control method. The method is applied to a system including an electronic device and a stylus. A touchscreen, and a display drive circuit and a touch sensor that match the touchscreen are configured in the electronic device. The method includes: The electronic device establishes a connection to the stylus. The electronic device performs pixel scan by using the display drive circuit. The electronic device collects a touch signal once by using the touch sensor after the display drive circuit scans S rows of pixels each time, where S≥1. The electronic device uses touch signals collected N consecutive times as one group and transmits an uplink synchronization signal to the outside in a slot for collecting a touch signal for the $K^{th}$ time in each group, where 1≤K≤N. The stylus obtains the uplink synchronization signal. The stylus transmits, in response to the obtained uplink synchronization signal, a downlink signal to the electronic device based on a downlink parameter negotiated when a connection to the electronic device is established for the first time. The downlink parameter includes: an offset of a first downlink signal from a start position of a frame synchronization signal in the electronic device, a time interval between adjacent downlink signals, and time required for each downlink signal. The electronic device obtains, by using the touch sensor, the downlink signal transmitted by the stylus.

According to the third aspect, S=H/N. H is a quantity of rows of pixels that the display drive circuit needs to scan when the touchscreen displays one frame of image at a standard frame rate.

According to the third aspect or any one of the foregoing implementations of the third aspect, the slot for collecting a touch signal for the $K^{th}$ time in each group is shorter than a slot for collecting a touch signal each time other than the $K^{th}$ time in each group.

According to the third aspect or any one of the foregoing implementations of the third aspect, the time required for each downlink signal is longer than a slot for collecting a touch signal each time.

According to a fourth aspect, this application provides an electronic device, including: a touchscreen; a display drive circuit and a touch sensor that match the touchscreen; at least one memory, configured to store a program; and at least one processor, configured to execute the program stored in the memory, where when the program stored in the memory is executed, the processor is configured to perform the method provided in the first aspect.

According to a fifth aspect, this application provides a stylus, including: a communication module, configured to communicate with an electronic device; at least one memory, configured to store a program; and at least one processor, configured to execute the program stored in the memory, where when the program stored in the memory is executed, the processor is configured to perform the method provided in the second aspect.

According to a sixth aspect, this application provides a computer-readable storage medium. The computer-readable storage medium stores a computer program. When the computer program is run on an electronic device, the electronic device is enabled to perform the method provided in the first aspect, or when the computer program is run on a stylus, the stylus is enabled to perform the method provided in the second aspect.

According to a seventh aspect, this application provides a computer program product. When the computer program product runs on an electronic device, the electronic device is enabled to perform the method provided in the first aspect, or when the computer program product runs on a stylus, the stylus is enabled to perform the method provided in the second aspect.

It may be understood that, for beneficial effects of the second aspect to the seventh aspect, refer to related descriptions in the first aspect. Details are not described herein again.

BRIEF DESCRIPTION OF DRAWINGS

The following briefly describes accompanying drawings used in describing embodiments or the conventional technology.

DESCRIPTION OF EMBODIMENTS

The term "and/or" in this specification describes an association relationship between associated objects and represents that three relationships may exist. For example, A and/or B may represent the following three cases: Only A exists, both A and B exist, and only B exists. The character "/" in this specification represents an "or" relationship between the associated objects. For example, A/B represents A or B.

In the specification and claims of this specification, the terms "first", "second", and so on are intended to distinguish between different objects, but do not indicate a particular order of the objects. For example, a first response message, a second response message, and the like are used to distinguish between different response messages, but do not indicate a particular order of the response messages.

In embodiments of this application, the word such as "example" or "for example" is used to represent an example, an illustration, or a description. Any embodiment or design described by "example" or "for example" in embodiments of this application should not be construed as being more preferred or advantageous than another embodiment or design. To be precise, the word such as "example" or "for example" is intended to present a related concept in a specific manner.

In the descriptions of embodiments of this application, unless otherwise specified, "a plurality of" means two or more. For example, a plurality of processing units are two or more processing units, and a plurality of elements are two or more elements.

Figure 1:
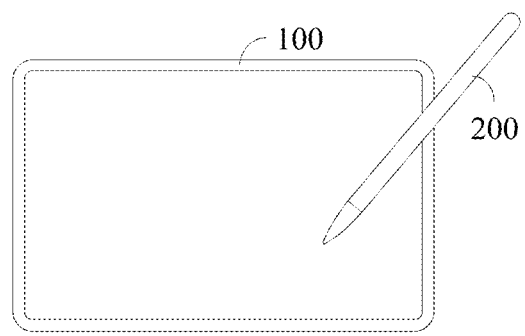
FIG. 1 is a diagram of an application scenario according to an embodiment of this application.

For example, FIG. 1 shows an application scenario in some embodiments of this application. As shown in FIG. 1, a user may perform input on an electronic device 100 by using a stylus 200. The electronic device 100 may be but is not limited to an electronic device having a touchscreen, such as a mobile phone or a tablet computer. The stylus 200 may be but is not limited to an active capacitive stylus.

In FIG. 1, when a screen of the electronic device 100 performs frame rate switching, the electronic device usually performs frame rate switching by using a CMD command, and a time sequence of the CMD command is strictly limited. When the CMD command is sent with a delay or is sent erroneously, it is difficult for the touchscreen on the electronic device 100 to collect a downlink signal of the stylus 200. Consequently, a case of discontinuous lines may occur in an input process of the stylus 200. For example, when the stylus 200 is used to draw a line on the touchscreen, the line displays on the touchscreen as a series of disconnected segments. In addition, a sampling slot of the touchscreen on the electronic device 100 is allocated based on a vertical synchronization (VSync) mechanism in an existing protocol. Therefore, when there is no multiple relationship between frame rates before and after switching (for example, switching from 120 Hz to 90 Hz), it is difficult to perform time sequence alignment between a sampling moment of the touchscreen on the electronic device 100 and time for transmitting the downlink signal by the stylus 200 continuously. As a result, it is difficult for the touchscreen on the electronic device 100 to collect the downlink signal of the stylus 200. Consequently, a case of discontinuous lines may occur in an input process of the stylus 200.

To avoid the described case, an embodiment of this application provides an electronic device control method. In the method, after the electronic device 100 establishes a connection to the stylus 200, the electronic device 100 may collect a touch signal once after the display drive circuit that matches the touchscreen and that is in the electronic device scans S rows of pixels each time. This process is cyclically performed by using N times of touch signal collection as a cycle, until the electronic device 100 and the stylus 200 are disconnected. When collecting a touch signal for the $K^{th}$ time in each cycle, the electronic device 100 may transmit an uplink synchronization (uplink) signal to the outside, where $1 \leq K \leq N$. After the stylus 200 establishes the connection to the electronic device 100, when the uplink signal is obtained for the first time, the stylus 200 may transmit the downlink signal based on a downlink parameter negotiated when the connection is established between the stylus 200 and the electronic device 100 (for example, when the connection is established for the first time). In this way, regardless of changes in the frame rate of the touchscreen on the electronic device 100, time for collecting a touch signal by the electronic device 100 each time is fixed. Therefore, collecting, by the electronic device 100, a downlink signal of the stylus 200 is not affected. In other words, a case of inputting discontinuous lines by the stylus 200 may not occur.

Figure 2:
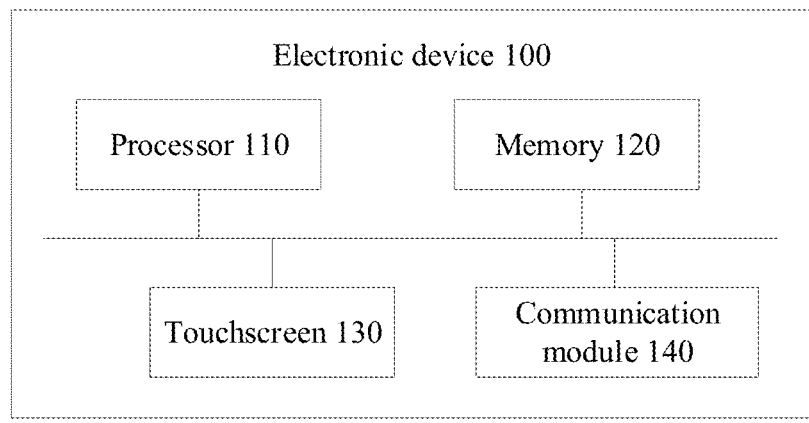
FIG. 2 is a diagram of a structure of an electronic device according to an embodiment of this application.

For example, FIG. 2 shows a hardware structure of the electronic device 100. As shown in FIG. 2, the electronic device 100 may include a processor 110, a memory 120, a communication module 140, and a touchscreen 130. It may be understood that the structure illustrated in FIG. 2 in this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 is a computing core and a control core of the electronic device 100. The processor 110 may include one or more processing units. For example, the processor 110 may include one or more of an application processor (AP), a modem, a graphics processing unit (GPU), an image signal processor (ISP), a controller, a video codec, a digital signal processor (DSP), a baseband processor, and a neural-network processing unit (NPU). Different processing units may be independent components, or may be integrated into one or more processors. For example, the processor 110 may be configured to: after the electronic device 100 establishes a connection to the stylus 200, control the touchscreen 130 to transmit an uplink synchronization signal to the outside, control the touchscreen 130 to collect a touch signal, and the like.

The memory 120 may store a program. The program may be run by the processor 110, so that the processor 110 can perform at least some or all of the steps in the method provided in embodiments of this application. The memory 120 may further store data. The processor 110 may read the data stored in the memory 120. The memory 120 and the processor 110 may be separately disposed. In addition, the memory 120 may alternatively be integrated into the processor 110.

The communication module 140 may include a wireless communication module. The communication module 140 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. For example, the communication module 140 may be configured to establish a connection between the electronic device 100 and the stylus 200. For example, the communication module 140 may be a Bluetooth module.

The touchscreen 130 may be configured to display an image, a video, and the like. The touchscreen 130 may include a display panel. The display panel may use, but is not limited to, a liquid crystal display (LCD). The touchscreen 130 may use an in-cell touch technology. That is, a touch sensor is embedded inside the display screen. The touch sensor may be configured to collect a touch signal on the touchscreen 130. For example, in addition to displaying a graph and a video, the touchscreen 130 may be further configured to: after the electronic device 100 establishes a connection to the stylus 200, transmit an uplink synchronization signal to the outside, and obtain a downlink signal transmitted by the stylus 200.

In some embodiments, when displaying an image, the touchscreen 130 displays one frame of image. When displaying a video, the touchscreen 130 sequentially displays, according to a time sequence, frames of images included in the video. Each frame of image may be divided into several basic viewpoints (pixels), and each pixel has independent color information. When the touchscreen 130 displays one frame of image, the processor 110 may control a display drive circuit that matches the touchscreen 130 to sequentially scan pixels on the frame of image row by row, to form a complete picture. The picture is obtained through continuous scan, and a dynamic image may be "displayed" by using persistence of vision of human eyes. For example, the display drive circuit may, but is not limited to, sequentially scan row by row from top to bottom in an operation process. For example, the display drive circuit may be but is not limited to being integrated into the touchscreen 130.

Figure 3:
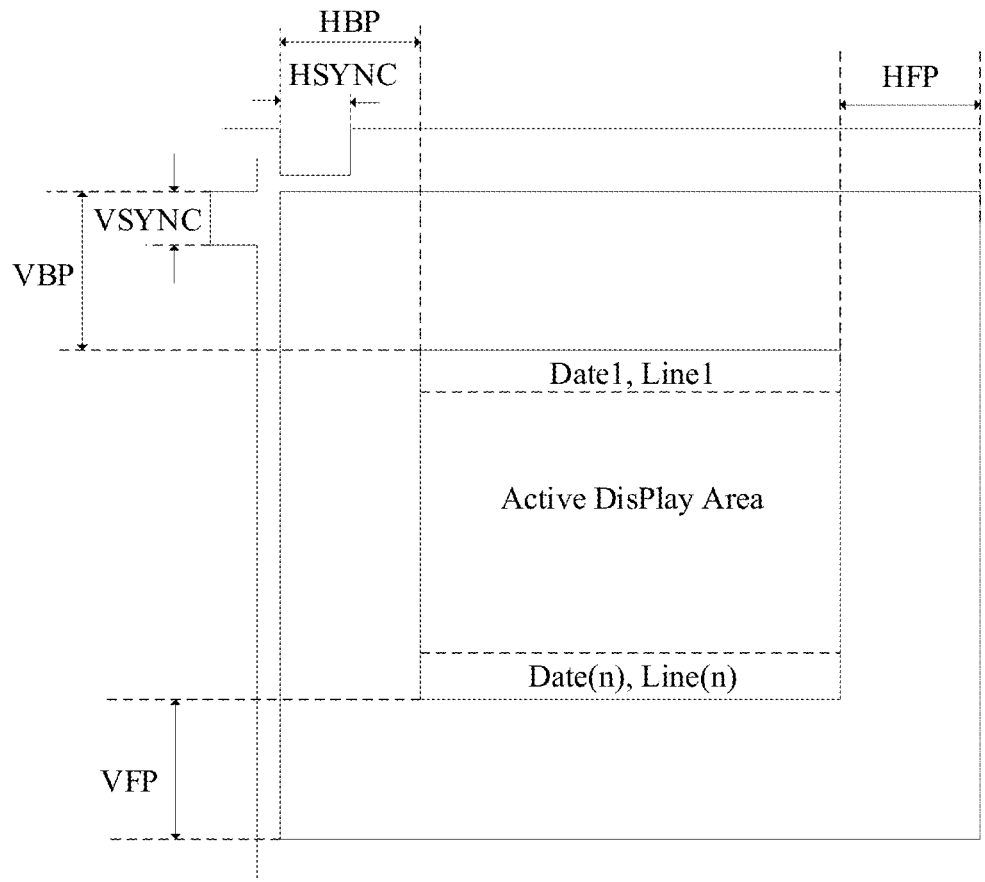
FIG. 3 is a diagram of a process in which a display drive circuit that matches a touchscreen and that is in an electronic device scans a row of pixels according to an embodiment of this application.

For ease of understanding, the following describes, by using an example, a process in which the touchscreen 130 displays one frame of image. As shown in FIG. 3, when one frame of image needs to be displayed, the processor 110 may trigger generation of a vertical synchronization (VSYNC) signal, where the signal may also be referred to as a frame synchronization signal, so that the display drive circuit may learn that displaying of a new picture needs to be started. After the VSYNC signal is transmitted, a flyback time needs to be reserved for the display drive circuit. An interval from a start of the VSYNC signal to a start of scan of the first row is referred to as a vertical back porch (VBP). An interval from an end of scan of the last row to a start of a next VSYNC signal is referred to as a vertical front porch (VFP).

When the display drive circuit scans each row, the processor 110 may trigger generation of a horizontal synchronization (HSYNC) signal, so that the display drive circuit may learn that scan of a new row of pixels needs to be started. Each row of information starts with an HSYNC signal. After the HSYNC signal is transmitted, a flyback time needs to be reserved for the display drive circuit. An interval from a start of the HSYNC signal to a start of data enable is referred to as a horizontal back porch (HBP). An interval from an end of the data enable to a start of a next HSYNC signal is referred to as a horizontal front porch (HFP). An interval from the start of the data enable to the end of the data enable may be understood as an interval shown in a gray region in FIG. 3.

Still refer to FIG. 3. In a process of scanning a row of pixels, the display drive circuit may perform scan from left to right. When the display drive circuit completes scanning a row of pixels, and obtains a new HSYNC signal, the display drive circuit may jump from a rightmost side of the row currently scanned by the display drive circuit to a leftmost side, move down one row, and start to scan a next row of pixels. When the display drive circuit receives a new VSYNC signal, the display drive circuit may jump from a bottommost position in FIG. 3 to a topmost position at a left vertex, to start scanning a new image.

Figure 4:
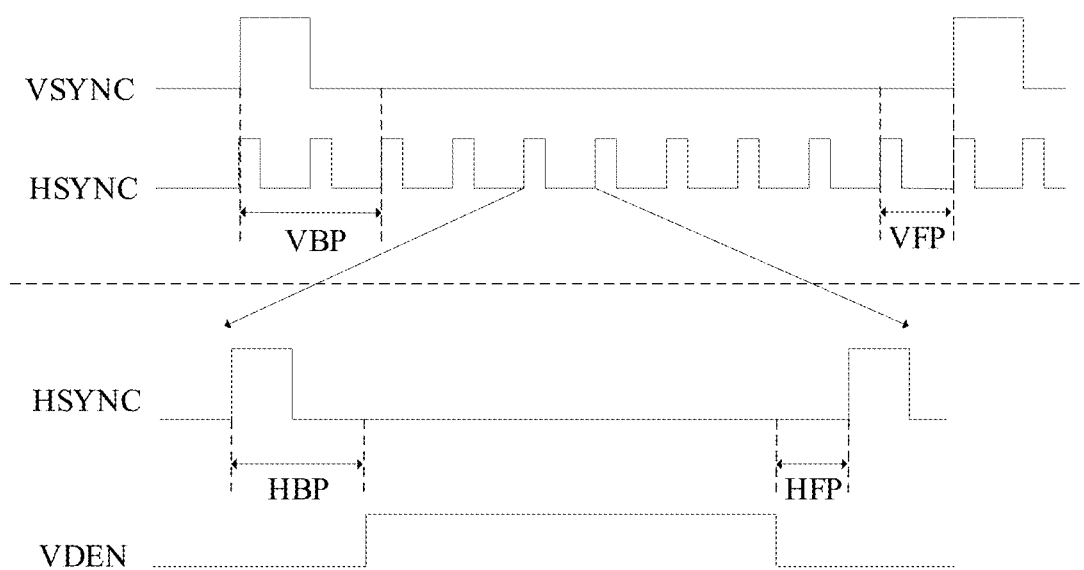
FIG. 4 is a diagram of a time sequence of a display drive circuit that matches a touchscreen and that is in an electronic device scanning a row of pixels according to an embodiment of this application.

For example, FIG. 4 is a diagram of a signal time sequence of a display drive circuit scanning a pixel. As shown in FIG. 4, each frame of image corresponds to one VSYNC signal, and corresponds to a plurality of HSYNC signals. Each HSYNC signal corresponds to one row of pixels that need to be scanned. Between two HSYNC signals, time remaining after removing the time occupied by the HBP and the HFP is time for a video data enable (VDEN) signal.

In this embodiment of this application, in a process in which the touchscreen 130 displays one frame of image, the processor 110 may control a touch sensor on the touchscreen to collect a touch signal once after the display drive circuit scans S rows of pixels each time. This process is cyclically performed by using N times of touch signal collection as a cycle, until the electronic device 100 and the stylus 200 are disconnected. Duration of collecting a touch signal each time may be preset. For example, duration t of collecting a touch signal each time may be longer than 100 microseconds (µs) and shorter than 300 µs.

In addition, in this embodiment of this application, a standard frame rate may be predefined. A quantity of times that the display drive circuit needs to collect a touch signal when the touchscreen 130 displays one frame of image at the standard frame rate is defined by using the standard frame rate as a reference. When the touchscreen 130 displays one frame of image at a standard frame rate, the display drive circuit needs to scan H rows of pixels, and the defined quantity of times that a touch signal needs to be collected is N. In this case, for every S rows of pixels above, S=H/N. In this way, switching between a plurality of frame rates that can exactly divide (F*N) is implemented, where F is a frame rate of a standard frame rate. S rows may be added or reduced each time. Therefore, switching between a plurality of frame rates can be supported when a maximum frame rate is (F*N). For example, when F=60 Hz, if N=4, switching between a plurality of frequencies such as 240 Hz, 120 Hz, 80 Hz, 60 Hz, and 48 Hz can be supported. In other words, switching between frame rates that can exactly divide (60*4=240) can be supported. It may be understood that, time required for displaying at a standard frame rate is T=1/F, an equivalent time for displaying a row is th=T/H, and a corresponding equivalent time for displaying S rows is tx=S*th=S*T/H=T/N. Therefore, tx=1/F/N=1/(F*N). In this case, a maximum frame rate that can be supported is Fx=F*N. In other words, switching between a plurality of frame rates can be supported when a maximum frame rate is (F*N).

In some embodiments, when the touchscreen 130 displays an image at a standard frame rate, a slot for collecting a touch signal for the $K^{th}$ time after a VSYNC signal corresponding to one frame of image may be defined as a slot for transmitting an uplink (uplink) synchronization signal by the touchscreen 130 to the outside. The uplink signal may be, but is not limited to being, used to perform time alignment with the stylus 200. After the stylus 200 establishes a connection to the electronic device 100, and after the stylus 200 obtains the uplink signal for the first time, the stylus 200 may transmit a downlink signal based on a downlink parameter negotiated between the stylus 200 and the electronic device 100. In this way, time sequence alignment between a sampling moment of the electronic device 100 and time for transmitting the downlink signal by the stylus 200 continuously is performed. A probability of inputting discontinuous lines by the stylus 200 in an input process is reduced, and user experience is improved. In some embodiments, downlink parameters may be some parameters required by the stylus 200 for transmitting a downlink signal. The downlink signal may be a signal transmitted to the electronic device 100 after the stylus 200 obtains the uplink signal transmitted by the electronic device 100. The signal may be used to determine a touch position, a tilt angle, and the like of the stylus 200. In some embodiments, a signal transmitted by the electronic device 100 to the outside may be referred to as an uplink signal, and a signal transmitted by the stylus 200 to the outside may be referred to as a downlink signal.

In some embodiments, the downlink parameter may include an offset of a first downlink signal from a start position of the VSYNC signal, a time interval between adjacent downlink signals, and time required for each downlink signal. In addition, the downlink parameter may further include a quantity of downlink signals required by the touchscreen 130 to display one frame of image at a standard frame rate. The quantity of downlink signals required by the touchscreen 130 to display one frame of image at a standard frame rate may be (N−1).

Figure 5:
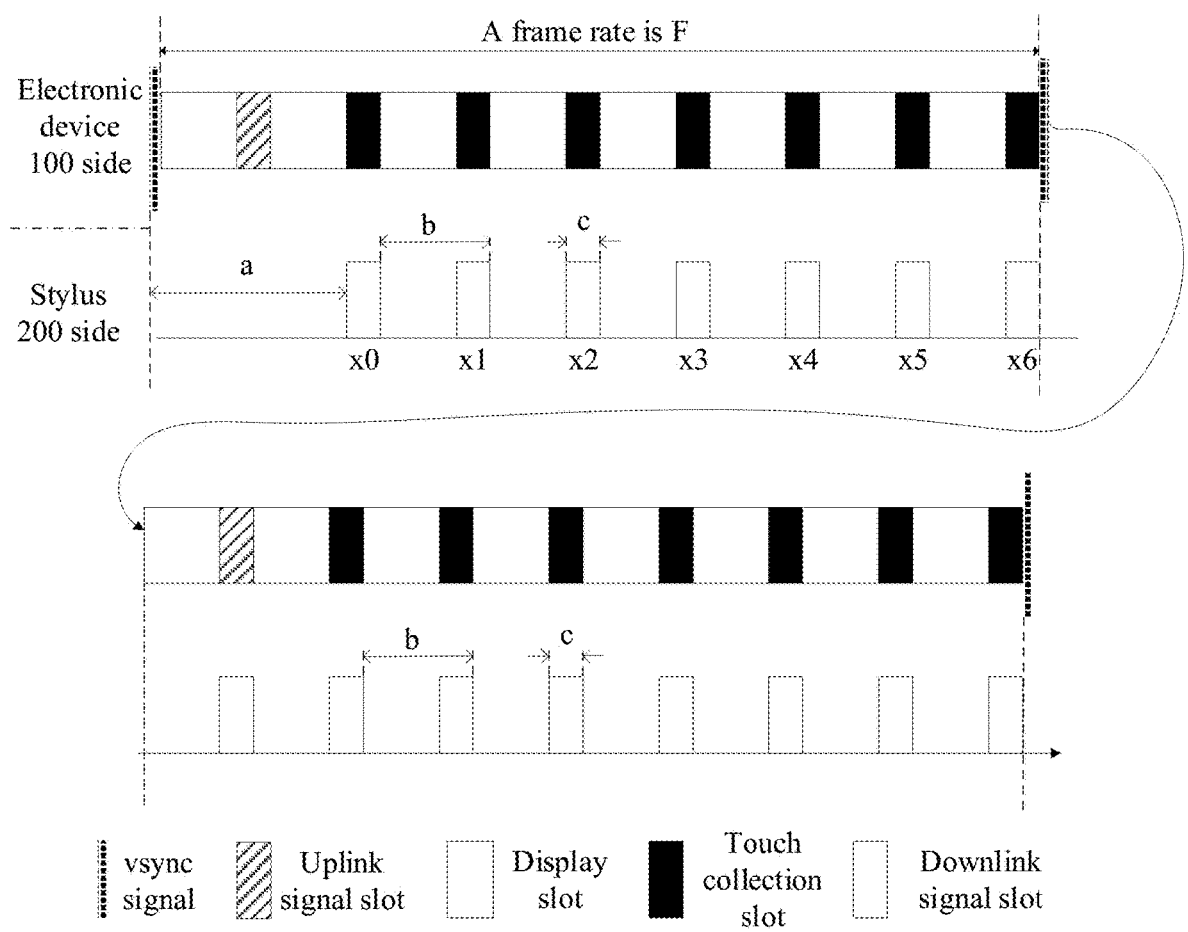
FIG. 5 is a diagram in which an electronic device collects a touch signal and a stylus transmits a downlink signal when the electronic device displays an image at a frame rate of F according to an embodiment of this application.

For example, as shown in FIG. 5, a in the figure represents an offset of a first downlink signal from a start position of a VSYNC signal, b represents a time interval between adjacent downlink signals, and c represents time required for each downlink signal. In FIG. 5, an uplink signal slot is time for transmitting an uplink signal by the electronic device 100, a display slot is time for displaying an image by the electronic device 100, a touch collection slot is time for collecting a touch signal by the electronic device 100, and a stylus coding slot is time for transmitting a downlink signal by the stylus 200. In addition, in the embodiment shown in FIG. 5, the touchscreen 130 of the electronic device 100 displays an image at a standard frame rate F, and the electronic device 100 needs to collect a touch signal eight times. When collecting a touch signal for the first time, the electronic device 100 transmits an uplink signal to the outside. When collecting a touch signal subsequently, the electronic device 100 may collect a downlink signal transmitted by the stylus 200, or may collect a touch signal triggered by a touch body such as a finger of a user. In FIG. 5, the stylus 200 needs to transmit a downlink signal seven times. In some embodiments, the electronic device 100 may determine, based on a frequency, an amplitude, and the like of the obtained touch signal, whether the touch signal is triggered and generated by the stylus 200, or triggered and generated by the touch body such as a finger of a user. In some embodiments, a frequency of a touch signal generated by the stylus 200 is usually 120 Hz to 360 Hz, and a frequency of a touch signal generated by a finger touch is usually 60 Hz to 120 Hz. Therefore, the electronic device 100 may determine, based on the frequency of the obtained touch signal, whether the touch signal is triggered and generated by the stylus 200, or triggered and generated by a finger of a user.

Still refer to FIG. 5. After the stylus 200 establishes a connection to the electronic device 100, when obtaining, for the first time, the uplink signal transmitted by the electronic device 100, the stylus 200 may start to transmit the downlink signal after duration a. Duration for transmitting the downlink signal is c. The downlink signal is transmitted at an interval of duration b until the stylus 200 and the electronic device 100 are disconnected.

It may be understood that when the electronic device 100 displays an image at a standard frame rate, the electronic device 100 and the stylus 200 may operate in the manner described in FIG. 5. When the electronic device 100 does not display an image at a standard frame rate, but displays an image at a multiple of the standard frame rate, and when the electronic device 100 establishes a connection to the stylus 200, the electronic device 100 may first operate in the manner in FIG. 5. In addition, the electronic device 100 may count a quantity of times of collecting a touch signal by the electronic device 100. When the quantity of times of collecting a touch signal counted by the electronic device 100 reaches N, the electronic device 100 may re-count a quantity of times of collecting a touch signal, and transmit an uplink signal in a slot for collecting a touch signal for the $K^{th}$ time (in this case, K=1) counted by the electronic device 100. This process is cyclically performed, until the electronic device 100 and the stylus 200 are disconnected. The stylus 200 may continue to operate according to the descriptions in FIG. 5.

Figure 6:
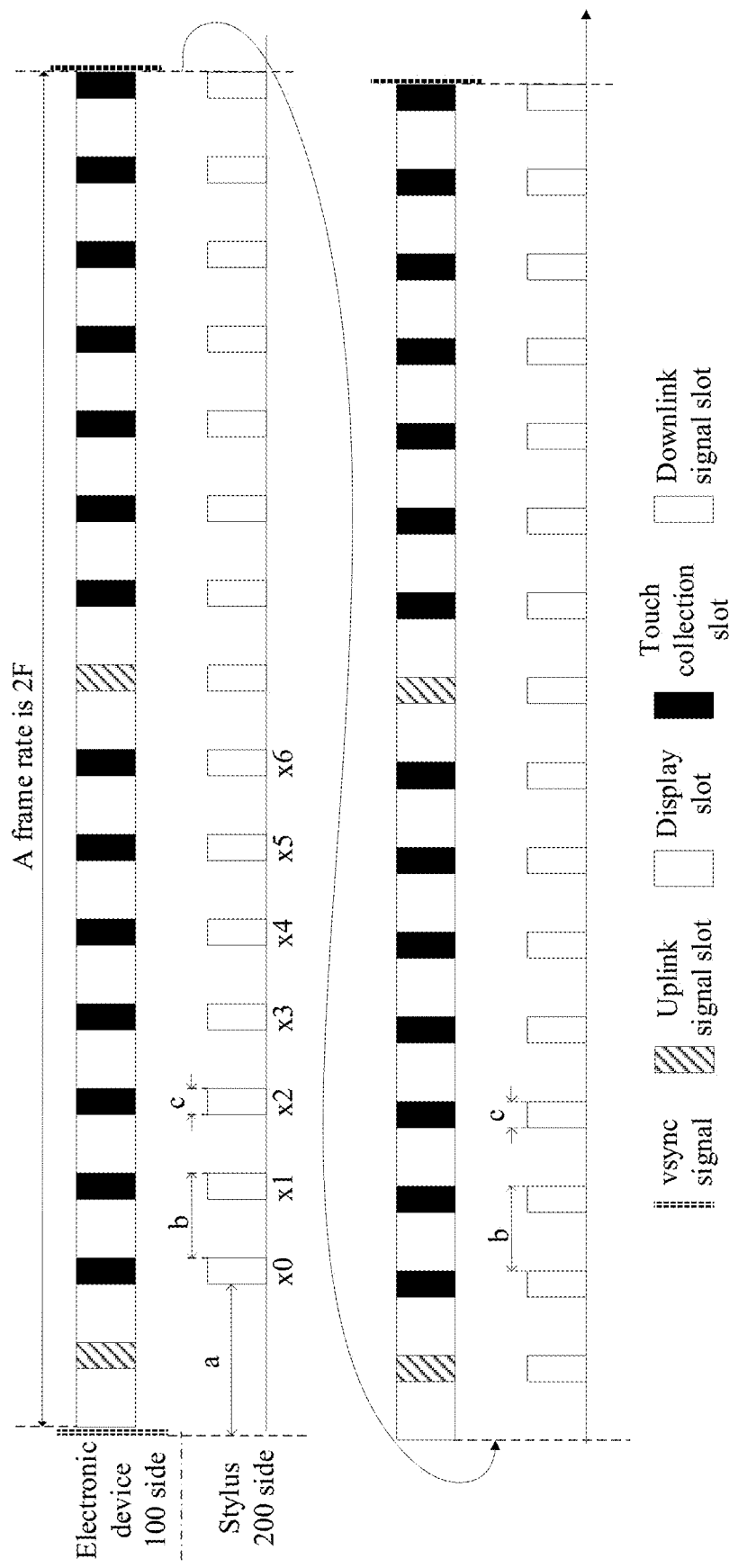
FIG. 6 is a diagram in which an electronic device collects a touch signal and a stylus transmits a downlink signal when the electronic device displays an image at a frame rate of 2F according to an embodiment of this application.

For example, if the electronic device 100 displays an image at a frame rate twice the standard frame rate F, and a quantity N of times of collecting a touch signal is set to 8 at the standard frame rate F, the electronic device 100 transmits an uplink signal to the outside when collecting a touch signal for the $K^{th}$ time (in this case, K=1). In this case, when the electronic device 100 displays one frame of image, a total of (2N) touch signals need to be collected. As shown in FIG. 6, after the electronic device 100 establishes a connection to the stylus 200, when the electronic device 100 starts to display one frame of image for the first time, the electronic device 100 may collect a touch signal at the foregoing interval of S rows after generating a vsync signal. The electronic device 100 may transmit the uplink signal to the outside when the touch signal needs to be collected for the $K^{th}$ time (in this case, K=1). In addition, the electronic device 100 may count a quantity of times that the electronic device 100 collects the touch signal. When a quantity of times counted by the electronic device 100 reaches 8, the electronic device 100 may re-count a quantity of times that the electronic device 100 collects a touch signal (that is, a counting result is returned to zero), transmit an uplink signal to the outside again when a touch signal needs to be collected for the $K^{th}$ time, and continue to count a quantity of times that a touch signal is collected. This process is cyclically performed, until the electronic device 100 and the stylus 200 are disconnected. The stylus 200 may continue to operate according to the descriptions in FIG. 5.

In addition, when frame rate switching occurs in a process of displaying an image by the electronic device 100, the electronic device 100 may still operate in the manner described in FIG. 6.

Figure 7:
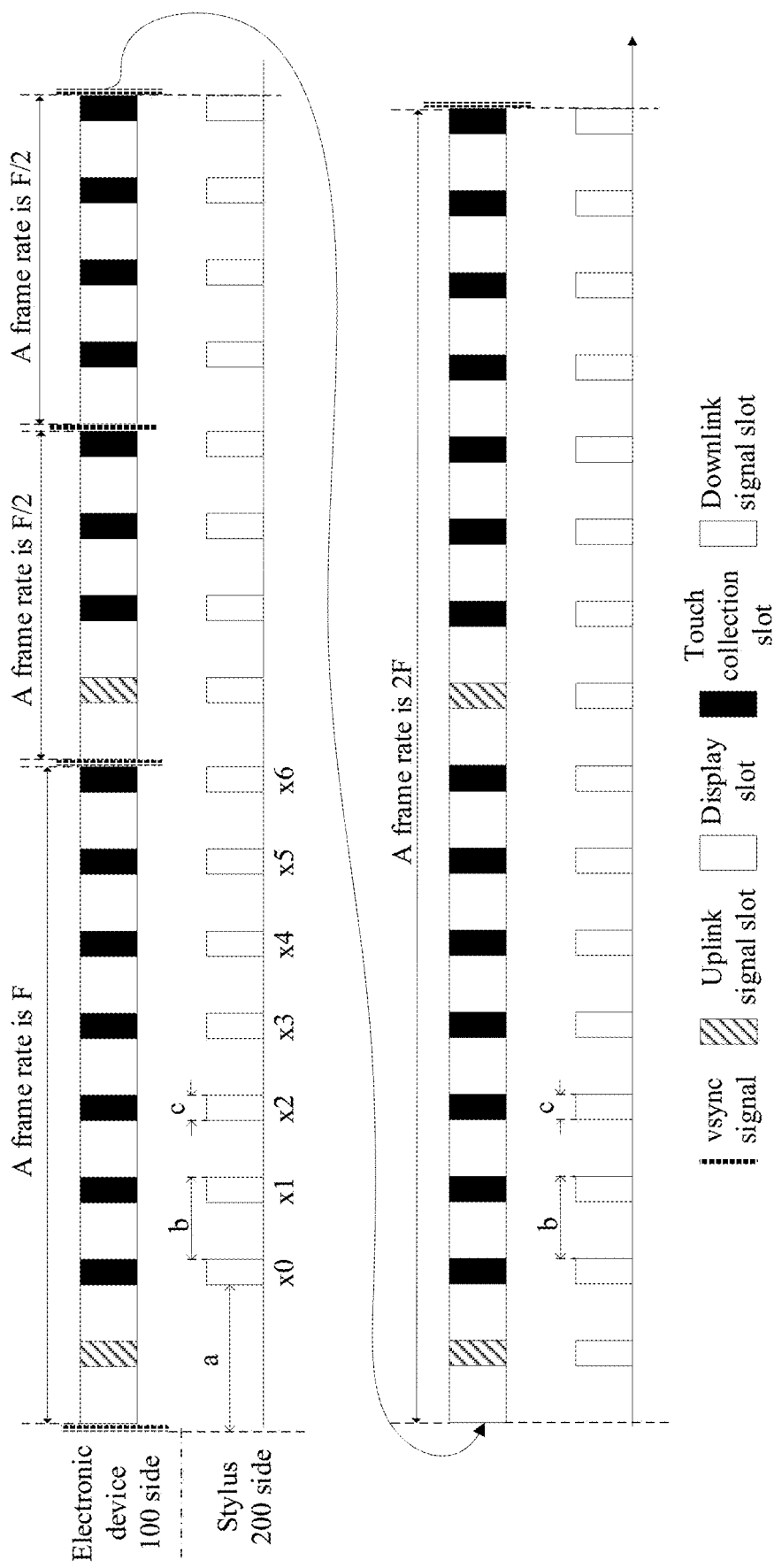
FIG. 7 is a diagram in which an electronic device collects a touch signal and a stylus transmits a downlink signal when the electronic device displays an image and switches a frame rate according to an embodiment of this application.

For example, it is assumed that the electronic device 100 initially displays an image at the standard frame rate F, and sets, at the standard frame rate F, a quantity N of times of collecting a touch signal to 8. After a period of time, the electronic device 100 starts to display an image at ½ of the standard frame rate F, and after another period of time, starts to display an image at a frame rate twice the standard frame rate F. As shown in FIG. 7, after the electronic device 100 establishes a connection to the stylus 200, in this case, the electronic device 100 displays an image at the standard frame rate F. When the electronic device 100 starts to display one frame of image for the first time, the electronic device 100 may collect a touch signal at the foregoing interval of S rows after generating a vsync signal. The electronic device 100 may transmit the uplink signal to the outside when the touch signal needs to be collected for the $K^{th}$ time (in this case, K=1). In addition, the electronic device 100 may count a quantity of times that the electronic device 100 collects the touch signal. When a quantity of times counted by the electronic device 100 reaches 8, the electronic device 100 may re-count a quantity of times that the electronic device 100 collects a touch signal (that is, a counting result is returned to zero, or in other words, reset), transmit the uplink signal to the outside again when a touch signal needs to be collected for the $K^{th}$ time, and continue to count a quantity of times that a touch signal is collected. This process is cyclically performed, until the electronic device 100 and the stylus 200 are disconnected. The stylus 200 may continue to operate according to the descriptions in FIG. 5.

Still refer to FIG. 7. When the electronic device 100 switches the frame rate from F to F/2, the quantity of times of collecting the touch signal counted by the electronic device 100 is exactly eight. Therefore, in this case, the quantity of times of collecting the touch signal may be re-counted, and the uplink signal is transmitted to the outside at time for collecting the touch signal for the $K^{th}$ time. When the electronic device 100 displays an image at a frame rate of F/2, and the electronic device 100 displays a second frame of image, the quantity of times of collecting a touch signal counted by the electronic device 100 is 4, and does not reach 8. Therefore, the electronic device 100 may continue to collect a touch signal once at an interval of every S rows, and does not transmit the uplink signal to the outside before the quantity of times that is counted reaches 8.

When the electronic device 100 switches the frame rate from F/2 to 2F, the quantity of times of collecting the touch signal counted by the electronic device 100 is exactly eight. Therefore, in this case, the quantity of times of collecting the touch signal may be re-counted, and the uplink signal is transmitted to the outside at time for collecting the touch signal for the $K^{th}$ time. This process is cyclically performed, until the electronic device 100 and the stylus 200 are disconnected.

It may be learned from the foregoing descriptions in FIG. 5, FIG. 6, and FIG. 7 that, regardless of changes in the frame rate of the touchscreen on the electronic device 100, the electronic device 100 may collect a downlink signal of the stylus 200 when collecting a touch signal each time. In other words, a case of inputting discontinuous lines by the stylus 200 may not occur. It should be understood that FIG. 5, FIG. 6, and FIG. 7 are all described by using a case in which K=1. For a case in which K is another value, refer to the description of K=1. Details are not described herein again.

In some embodiments, time for transmitting an uplink signal to the outside by the electronic device 100 is usually short, and time for collecting a touch signal is usually long. Therefore, to avoid a waste of time, a slot that is for collecting a touch signal and that is occupied for transmitting the uplink signal may be reduced. In other words, a slot that is for collecting a touch signal and that is used to transmit the uplink signal may be designed to be shorter than a slot for collecting a touch signal at another time.

In some embodiments, the electronic device 100 may further count a total quantity of rows of pixels scanned between two vsync signals by the display drive circuit that matches the touchscreen 130. When the electronic device 100 triggers generation of a new vsync signal, if a total quantity of rows counted by the electronic device 100 does not reach a quantity of rows required for displaying one frame of image at a current frame rate, the electronic device 100 may determine that an hsync signal loss phenomenon exists. In this case, the electronic device 100 may re-count a quantity of rows of pixels scanned by the display drive circuit. In this way, the hsync signal is calibrated by using the vsync signal.

Figure 8:
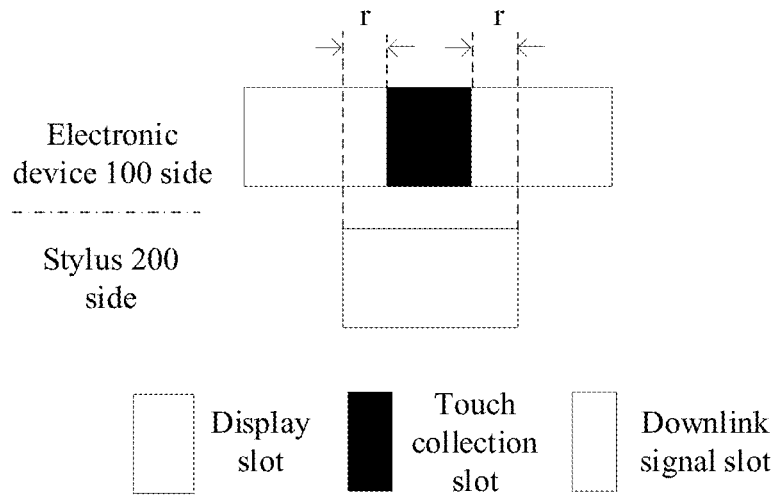
FIG. 8 is a diagram in which a coding slot of a stylus is longer than a touch collection slot of an electronic device according to an embodiment of this application.

In addition, when the hsync signal is lost, an error occurs in a quantity of rows in which pixels scanned by the display drive circuit are located that is counted by the electronic device 100. Consequently, time for collecting a touch signal by the electronic device 100 deviates from time for transmitting a downlink signal by the stylus 200. To reduce occurrence of this case, in this embodiment of this application, the time for transmitting a downlink signal by the stylus 200 may be prolonged, so that the time for transmitting a downlink signal by the stylus 200 is longer than the time for collecting a touch signal by the electronic device 100. In this way, when the deviation between the time for collecting a touch signal by the electronic device 100 and the time for transmitting the downlink signal by the stylus 200 is within a specific range, the electronic device 100 may still collect the downlink signal of the stylus 200. For example, as shown in FIG. 8, the time for transmitting a downlink signal by the stylus 200 is longer than the time for collecting a touch signal by the electronic device 100. In this case, when an offset of the time for collecting a touch signal by the electronic device 100 is less than r, the electronic device 100 may completely collect the downlink signal of the stylus 200.

Figure 9:
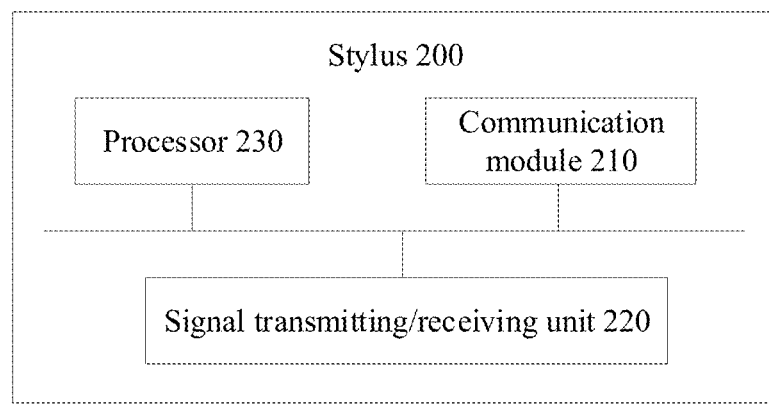
FIG. 9 is a diagram of a hardware structure of a stylus according to an embodiment of this application.

For example, FIG. 9 shows a hardware structure of a stylus 200. As shown in FIG. 9, the stylus 200 may include a communication module 210, a signal transmitting/receiving unit 220, and a processor 230.

The communication module 210 may include a wireless communication module, and the wireless communication module may be configured to establish a connection between the stylus 200 and the electronic device 100. For example, the communication module 210 may be a Bluetooth module.

The signal transmitting/receiving unit 220 may be configured to obtain an uplink synchronization signal transmitted by the electronic device 100, and after obtaining the uplink synchronization signal, transmit a downlink signal based on a preset downlink parameter.

The processor 230 may negotiate a downlink parameter of the stylus 200 with the electronic device 100 by using the communication module 210, and control, based on the downlink parameter, the signal transmitting/receiving unit 220 to transmit a downlink signal.

It may be understood that the structure illustrated in FIG. 3 in this application does not constitute a specific limitation on the stylus 200. In some other embodiments of this application, the stylus 200 may include more or fewer components than those shown in the figure, some components may be combined, some components may be split, or different component arrangements may be used. The components shown in the figure may be implemented in hardware, software, or a combination of software and hardware.

The following describes, based on the content described above, an electronic device control method provided in embodiments of this application. It may be understood that the method is proposed based on the content described above. For some or all content of the method, refer to the foregoing descriptions.

Figure 10:
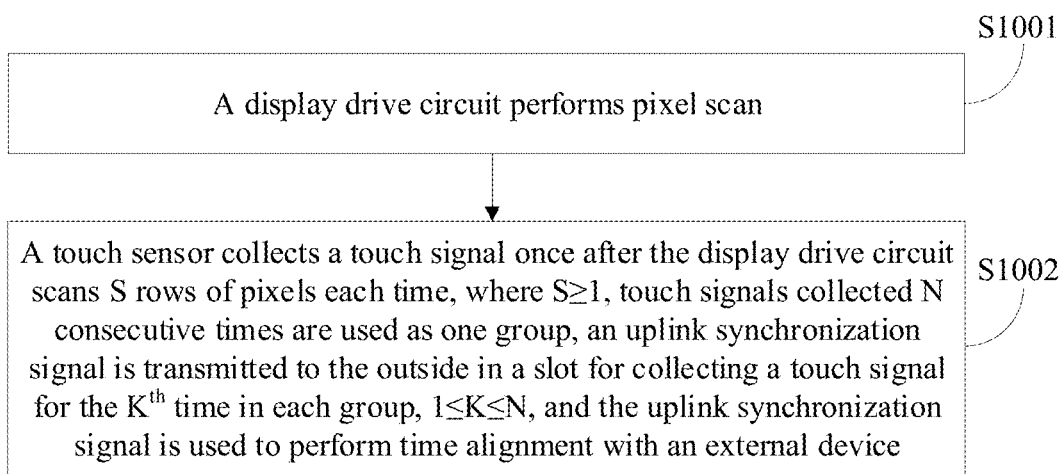
FIG. 10 is a schematic flowchart of an electronic device control method according to an embodiment of this application.

FIG. 10 is a schematic flowchart of an electronic device control method according to an embodiment of this application. The method may be applied to an electronic device having a touchscreen. A display drive circuit and a touch sensor that match the touchscreen may be configured in the electronic device. For example, the electronic device may be the electronic device 100 described above. As shown in FIG. 10, the electronic device control method may include the following steps.

S1001: The display drive circuit performs pixel scan.

In this embodiment, the display drive circuit on the electronic device may perform pixel scan row by row.

S1002: The touch sensor collects a touch signal once after the display drive circuit scans S rows of pixels each time, where S≥1, touch signals collected N consecutive times are used as one group, an uplink synchronization signal is transmitted to the outside in a slot for collecting a touch signal for the $K^{th}$ time in each group, 1≤K≤N, and the uplink synchronization signal is used to perform time alignment with an external device.

In this embodiment, in a process in which the display drive circuit performs pixel scan, the touch sensor may be controlled to collect a touch signal once after the display drive circuit scans S rows of pixels each time, where S≥1. The touch signals collected N consecutive times may be used as one group, the uplink synchronization signal is transmitted to the outside in a slot for collecting a touch signal for the $K^{th}$ time in each group, 1≤K≤N, and the uplink synchronization signal is used to perform time alignment with an external device (for example, a stylus). In other words, the touch sensor may collect a touch signal once after the display drive circuit scans S rows of pixels each time. This process is cyclically performed by using N times of touch signal collection as a cycle. In addition, the electronic device may transmit an uplink (uplink) synchronization signal to the outside in a slot for collecting a touch signal for the $K^{th}$ time in each cycle.

In this way, regardless of changes in a frame rate of the touchscreen on the electronic device, time for collecting a touch signal by the electronic device each time is fixed. Therefore, collecting, by the electronic device, a downlink signal transmitted by a stylus is not affected, reducing a probability of inputting discontinuous lines by the stylus, and improving user experience.

In some embodiments, after the electronic device establishes a connection to the stylus, when the display drive circuit on the electronic device obtains a frame synchronization signal and scans (K*S) rows of pixels for the first time, the electronic device may transmit the uplink synchronization signal to the outside, where the uplink synchronization signal is used to perform time alignment with the stylus. In other words, the uplink synchronization signal is transmitted to the outside in a slot for sending the uplink synchronization signal for the first time.

Then, after obtaining the uplink synchronization signal transmitted by the electronic device, the stylus may transmit a downlink signal to the electronic device based on a downlink parameter negotiated when a connection to the electronic device is established for the first time. The downlink parameter includes: an offset of a first downlink signal from a start position of the frame synchronization signal of the electronic device, a time interval between adjacent downlink signals, and time required for each downlink signal. In a possible implementation, the downlink parameter may be sent by the electronic device to the stylus.

Then, the electronic device may obtain, by using a touch sensor on the electronic device, the downlink signal transmitted by the stylus, and display, by using the touchscreen on the electronic device, a touch position corresponding to the obtained downlink signal. A plurality of touch positions connected based on a time sequence may form one touch track.

It may be understood that, the processor in embodiments of this application may be a central processing unit (CPU), and alternatively, the processor may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor or the like.

The method steps in embodiments of this application may be implemented by hardware, or may be implemented by the processor executing software instructions. The software instructions may include corresponding software modules. The software modules may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be understood that various numbers in embodiments of this application are merely used for differentiation for ease of description, and are not used to limit the scope of embodiments of this application.

The invention claimed is:

1. An electronic device control method, applied to an electronic device having a touchscreen, wherein a display drive circuit and a touch sensor that match the touchscreen are configured in the electronic device, and the method comprises:
performing, by the display drive circuit, pixel scan;
collecting, by the touch sensor, touch signals, each touch signal for a set of S rows of pixels scanned by the display drive circuit, wherein S≥1, wherein each N consecutive touch signals form a group; and
transmitting an uplink synchronization signal in a slot corresponding to a $K^{th}$ touch signal in each group, 1≤K≤N, and the uplink synchronization signal indicates time alignment for an external device.

2. The method according to claim 1, wherein S=H/N, and H is a quantity of rows of pixels that the display drive circuit needs to scan when the touchscreen displays one frame of image at a standard frame rate.

3. The method according to claim 1, wherein the slot for collecting the $K^{th}$ touch signal in each group is shorter than a slot for collecting a touch signal each time other than the $K^{th}$ time in each group.

4. The method according to claim 1, wherein the method further comprises:
determining a total quantity of rows of pixels scanned by the display drive circuit between a first frame synchronization signal and a second frame synchronization signal, wherein the second frame synchronization signal is adjacent to the first frame synchronization signal and is a next frame synchronization signal after the first frame synchronization signal; and
when the total quantity of rows is less than a target quantity of rows, re-counting a quantity of rows of pixels scanned by the display drive circuit, wherein the target quantity of rows is a quantity of rows of pixels that need to be scanned by the display drive circuit to display one frame of an image at a target frame rate, and the target frame rate is a current display frame rate of the touchscreen.

5. The method according to claim 1, wherein the method further comprises:
determining to establish a connection to a stylus; and
when the display drive circuit scans K*S rows of pixels for the first time after obtaining a frame synchronization signal, transmitting the uplink synchronization signal, wherein the uplink synchronization signal indicates time alignment to the stylus.

6. The method according to claim 5, wherein the method further comprises:
obtaining, by the touch sensor, a downlink signal from the stylus; and
displaying, by the touchscreen, a touch position corresponding to the obtained downlink signal.

7. The method according to claim 5, wherein the method further comprises:
when a connection to the stylus is established for the first time, sending a downlink parameter to the stylus, wherein
the downlink parameter comprises: an offset of a first downlink signal from a start position of the frame synchronization signal, a time interval between adjacent downlink signals, and a time required for each downlink signal.

8. The method according to claim 7, wherein the time required for each downlink signal is longer than a slot for collecting a touch signal each time.

9. An electronic device, comprising:
a touchscreen;
a display drive circuit and a touch sensor that match the touchscreen;
at least one memory, storing a program; and
at least one processor, configured to execute the program stored in the memory, wherein when the program stored in the memory is executed, the processor is configured to perform following steps:
performing, by the display drive circuit, pixel scan;
collecting, by the touch sensor, touch signals, each touch signal for a set of S rows of pixels scanned by the display drive circuit, wherein S≥1, wherein each N consecutive touch signals form a group; and
transmitting an uplink synchronization signal in a slot corresponding to a $K^{th}$ touch signal in each group, 1≤K≤N, and the uplink synchronization signal indicates time alignment for an external device.

10. The electronic device according to claim 9, wherein S=H/N, and H is a quantity of rows of pixels that the display drive circuit needs to scan when the touchscreen displays one frame of image at a standard frame rate.

11. The electronic device according to claim 9, wherein the slot for collecting the $K^{th}$ touch signal in each group is shorter than a slot for collecting a touch signal each time other than the $K^{th}$ time in each group.

12. The electronic device according to claim 9, wherein the steps further comprise:
determining a total quantity of rows of pixels scanned by the display drive circuit between a first frame synchronization signal and a second frame synchronization signal, wherein the second frame synchronization signal is adjacent to the first frame synchronization signal and is a next frame synchronization signal after the first frame synchronization signal; and
when the total quantity of rows is less than a target quantity of rows, re-counting a quantity of rows of pixels scanned by the display drive circuit, wherein the target quantity of rows is a quantity of rows of pixels that need to be scanned by the display drive circuit to display one frame of an image at a target frame rate, and the target frame rate is a current display frame rate of the touchscreen.

13. The electronic device according to claim 9, wherein the steps further comprise:
determining to establish a connection to a stylus; and
when the display drive circuit scans K*S rows of pixels for the first time after obtaining a frame synchronization signal, transmitting the uplink synchronization signal, wherein the uplink synchronization signal indicates time alignment to the stylus.

14. The electronic device according to claim 13, wherein the steps further comprise:
obtaining, by the touch sensor, a downlink signal from the stylus; and
displaying, by the touchscreen, a touch position corresponding to the obtained downlink signal.

15. The electronic device according to claim 13, wherein the steps further comprise:

when a connection to the stylus is established for the first time, sending a downlink parameter to the stylus, wherein the downlink parameter comprises: an offset of a first downlink signal from a start position of the frame synchronization signal, a time interval between adjacent downlink signals, and a time required for each downlink signal.

16. The electronic device according to claim 15, wherein the time required for each downlink signal is longer than a slot for collecting a touch signal each time.

17. A non-transitory computer-readable storage medium, wherein the computer-readable storage medium stores a computer program, and when the computer program is run on an electronic device, the electronic device is enabled to perform the following steps:

performing, by the display drive circuit, pixel scan;

collecting, by the touch sensor, touch signals, each touch signal for a set of S rows of pixels scanned by the display drive circuit, wherein $S \geq 1$, wherein each N consecutive touch signals form a group; and transmitting an uplink synchronization signal in a slot corresponding to a $K^{th}$ touch signal in each group, $1 \leq K \leq N$, and the uplink synchronization signal indicates time alignment for an external device.

18. The non-transitory computer-readable storage medium according to claim 17, wherein S=H/N, and H is a quantity of rows of pixels that the display drive circuit needs to scan when the touchscreen displays one frame of image at a standard frame rate.

19. The non-transitory computer-readable storage medium according to claim 17, wherein the slot for collecting the $K^{th}$ touch signal in each group is shorter than a slot for collecting a touch signal each time other than the $K^{th}$ time in each group.

20. The non-transitory computer-readable storage medium according to claim 17, wherein the steps further comprise:

determining a total quantity of rows of pixels scanned by the display drive circuit between a first frame synchronization signal and a second frame synchronization signal, wherein the second frame synchronization signal is adjacent to the first frame synchronization signal and is a next frame synchronization signal after the first frame synchronization signal; and when the total quantity of rows is less than a target quantity of rows, re-counting a quantity of rows of pixels scanned by the display drive circuit, wherein the target quantity of rows is a quantity of rows of pixels that need to be scanned by the display drive circuit to display one frame of an image at a target frame rate, and the target frame rate is a current display frame rate of the touchscreen.

* * * * *